US007643627B2

(12) United States Patent
Starling et al.

(10) Patent No.: US 7,643,627 B2
(45) Date of Patent: Jan. 5, 2010

(54) METHODS, SYSTEMS AND STORAGE MEDIUMS FOR PROVIDING A SELF-PROVISIONING TELEPHONY SERVICE

(75) Inventors: Gerald A. Starling, Hampton, GA (US); Dirk S. Henson, Alpharetta, GA (US); Ken A. Loveless, Smyrna, GA (US); Jeffrey Broadus, Marietta, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 955 days.

(21) Appl. No.: 10/888,483

(22) Filed: Jul. 9, 2004

(65) Prior Publication Data

US 2006/0008066 A1    Jan. 12, 2006

(51) Int. Cl.
*H04M 3/42* (2006.01)
(52) U.S. Cl. .................. 379/201.12; 370/352; 370/356; 379/29.01; 379/90.01; 379/93.27; 379/243; 455/417
(58) Field of Classification Search ............ 379/201.12, 379/201.03, 29.01, 90.01, 93.27, 243; 455/405, 455/417; 370/352, 356
See application file for complete search history.

(56) References Cited

U.S. PATENT DOCUMENTS

| 5,402,477 | A | * | 3/1995 | McMahan et al. ...... 379/201.04 |
| 5,588,051 | A | * | 12/1996 | Berkowitz et al. .......... 379/243 |
| 5,644,619 | A | * | 7/1997 | Farris et al. ............... 379/29.01 |
| 5,749,075 | A | * | 5/1998 | Toader et al. .................. 705/14 |
| 5,774,526 | A | * | 6/1998 | Propp et al. ............... 379/90.01 |
| 5,937,048 | A | * | 8/1999 | Pelle ...................... 379/201.12 |
| 6,023,464 | A | * | 2/2000 | Woundy ...................... 370/352 |
| 6,272,115 | B1 | * | 8/2001 | Elliott, III .................... 370/259 |
| 6,304,647 | B1 | * | 10/2001 | Frost ..................... 379/201.12 |
| 6,546,095 | B1 | * | 4/2003 | Iverson et al. .......... 379/201.12 |
| 6,738,616 | B1 | * | 5/2004 | Link et al. ................... 455/417 |
| 6,744,759 | B1 | * | 6/2004 | Sidhu et al. ................. 370/356 |
| 6,771,751 | B1 | * | 8/2004 | Kasturi et al. ............ 379/93.27 |
| 6,847,704 | B1 | * | 1/2005 | Cherchali et al. ........ 379/93.05 |
| 6,856,616 | B1 | * | 2/2005 | Schuster et al. ............. 370/352 |
| 2004/0014453 | A1 | * | 1/2004 | Cashiola ..................... 455/405 |
| 2005/0233693 | A1 | * | 10/2005 | Karaoguz et al. .......... 455/3.06 |

* cited by examiner

*Primary Examiner*—Gerald Gauthier
(74) *Attorney, Agent, or Firm*—Cantor Colburn LLP

(57) ABSTRACT

Exemplary embodiments relate to methods, systems, and storage mediums for providing self-provisioning telephony services. The method includes receiving a request for the self-provisioning telephony services from a caller of a telecommunications service provider. The method also includes prompting the caller to provide information for facilitating implementation of the self-provisioning telephony services. The method further includes implementing the self-provisioning telephony services, without human intervention from a telecommunications service provider, in response to information received as a result of the prompting. The self-provisioning telephony services include activating an account for a new telephone number, modifying an account for an existing telephone number, retrieving a forgotten personal identification number, and canceling an account for an existing telephone number.

18 Claims, 3 Drawing Sheets

METHODS, SYSTEMS AND STORAGE MEDIUMS FOR PROVIDING A SELF-PROVISIONING TELEPHONY SERVICE

BACKGROUND OF THE INVENTION

Embodiments of the invention relate generally to telecommunications services, and more particularly, to methods, systems, and storage mediums for providing a self-provisioning telephony service.

As society becomes more mobile, more service industries are attempting to cater to the changing needs associated with individuals who are geographically displaced from their friends, family, and others but wish to remain 'connected.' Those who travel extensively to variable locations have a particularly difficult time maintaining communications with family and friends back home. College students are another example of consumers who may find themselves disconnected from family and friends at home due to the costs and inconveniences of existing telecommunications services. Telephones are arguably the most popular means by which these travelers stay in communication with their loved ones. In addition, as the population grows older and ages, parents on fixed incomes may become more concerned with costs of calling their children. Finally, a certain segment of work-at-home residential customers may find it beneficial to provide a toll free number to prospective customers calling their combined home and business telephone number. Unfortunately, however, there are an abundance of long-distance carriers, each with their own billing policies and related time/cost restrictions that can create a burden on the calling individual, and perhaps, have a negative impact on how and when a caller will 'phone home'.

What is needed, therefore, is a way to provide consumers with a simple, convenient, and reliable way of meeting their communications needs.

SUMMARY OF THE INVENTION

The above disadvantages and shortcomings are overcome or alleviated by methods, systems, and storage mediums for providing self-provisioning telephony services. Methods include receiving a request for the self-provisioning telephony services from a caller. Methods also include prompting the caller to provide information for facilitating implementation of the self-provisioning telephony services. Methods further include implementing the self-provisioning telephony services, without human intervention from a telecommunications service provider, in response to the prompting. The self-provisioning telephony services include activating an account for a new telephone number, modifying an account for an existing telephone number, retrieving a forgotten personal identification number, and canceling an account for an existing telephone number. These self-provisioning telephony services (activation, modification, providing forgotten information, and deactivation) are performed in a real-time manner, with each particular transaction being performed immediately after request is made.

Systems for providing self-provisioning telephony services include a service control server. The service control server is in communication with a customer calling device. The service control server receives requests for self-provisioning telephony services from a caller via the customer calling device. Systems also include a resource server in communication with the service control server. The resource server executes a self-provisioning telephony application and user interface, which prompts the customer to provide information and generates a provisioning order resulting from responses to the prompts. The service control server receives the provisioning order and executes the self-provisioning telephony services without human intervention from a telecommunications service provider.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

According to exemplary embodiments, the self-provisioning telephony system enables service users to activate, e.g., a toll-free number at any time of the day using, e.g., a toll-free service number provided to them. This is accomplished without the need for any human interaction. The service user calls the toll-free service number, provides input in response to prompts, and selects a PIN. The toll-free number is activated in minutes once a provisioning order is processed through the provisioning system. In a similar manner, service users may modify and/or cancel their toll-free service.

Figure 1:
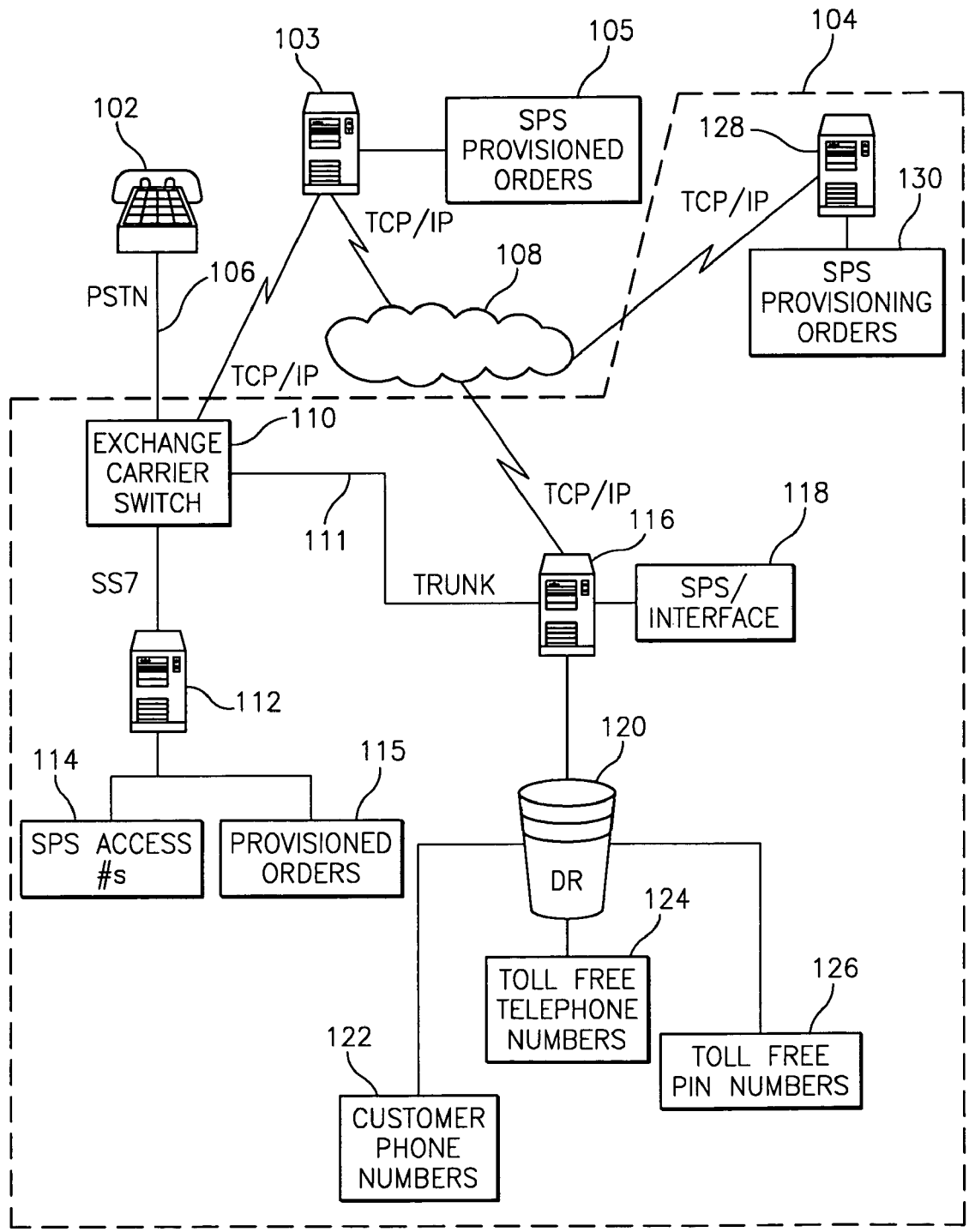
FIG. 1 is a block diagram of a system upon which the self-provisioning system may be implemented in exemplary embodiments.

Turning now to FIG. 1, a system upon which the self-provisioning system may be implemented will now be described. In exemplary embodiments, a telephone 102, operated by a caller who may be a customer of a telecommunications service provider, is shown in FIG. 1. In the description that follows, the terms "caller" and "customer" are used. However, it should be appreciated that more than one caller may share a customer account. The telecommunications service provider provides long distance telephone services to residential customers, typically for a specified geographic region, and may also provide long distance telephone services to business customers. A caller communicates with the telecommunications service provider using a calling device 102, such as a telephone, a personal computer, or a web-enabled mobile telephone, which is coupled to a public switched telephone network (PSTN) 106. In exemplary embodiments, the telecommunications service provider, through host system 104, also provides the self-provisioning services described herein. However, the telecommunications service provider may outsource a portion of these services to a third party system such as an application service provider (ASP) under an agreement.

The system shown in FIG. 1 also includes a billing server 103 in communication with host system 104 via a packet-switched network such as network 108. Billing server 103 executes a billing application for tracking the fees associated with the self-provisioning system. A customer account may be charged a fee for each minute of use similar to the fees associated with existing long distance telephone services. This usage may be tracked by host system 104 and customers may be billed via a billing application executing on server 103. In FIG. 1, billing server 103 is shown to be outside of host system 104 for security reasons (e.g., an extra layer of security may be provided between network 108 and billing server 103 in order to protect confidential customer and billing data). However, it is not necessary that billing server 103 reside outside of host system 104. With proper security systems/software in place, it is contemplated that billing server 103 may reside within host system 104. Billing server 103 receives provisioning orders from host system 104 which include customer information used to facilitate the billing process. These provisioning orders may be stored internally in server 103 as shown in FIG. 1 or may be stored in a memory location separate from server 103 which is logically addressable by server 103. The type of data that may be found in a provisioning order received at server 103 is shown generally in FIG. 3A and is described further herein.

As indicated above, a packet-switched network 108 is also included in the system shown in FIG. 1. Network 108 may be any suitable network such as an Intranet, Extranet, or Internet, and enables entities associated with the self-provisioning system to communicate with one another as will be described further herein.

Host system 104 includes an exchange carrier switch 110, a service control server 112, a resource server 116, and a provisioning server 128. Exchange carrier switch 110 may comprise a high capacity switching system designed to assist the networks of interexchange carriers (e.g., host system 104). Exchange carrier switch 110 utilizes hardware and software capable of handling large capacity voice and data communications for long distance telecommunications customers. Hardware utilized by exchange carrier switch 110 may include the DMS 250™ by Nortel Networks Corporation of Brampton, Ontario. In a typical telecommunications environment, when an 800-number call is placed by an individual, a local exchange carrier (not shown) associated with the individual queries a national database (not shown) to determine which carrier enterprise services that particular 800 number. In FIG. 1, exchange carrier switch 110 is determined to be the carrier (e.g., service provider) for the 800 number that was dialed.

Exchange carrier switch 110 also communicates with service control server 112 utilizing, e.g., Signaling Service No. 7 (SS7) protocol, which is described in "Telecommunications-Signaling System No. 7 (SS7)—General Information," T1.110, ANSI, 1992. Service control server 112 refers to a centralized database server that provides services such as 800-number translation. Service control server 112 sorts call handling and routing information for services executed by switching systems such as exchange carrier switch 110. Exchange carrier switch 110 accesses service control server 112 to perform look-ups of 800 numbers it receives. Based upon the results of the look-ups, service control server 112 returns routing instructions for the call to exchange carrier switch 110, which in turn, places the call. Exchange carrier switch 110 further communicates with resource server 116 via a primary rate interface (PRI) trunk 111. The PRI trunk 111 may be a DS1 line or T1 line having a channel reserved for primary rate interface (PRI) signaling.

Figure 3A:
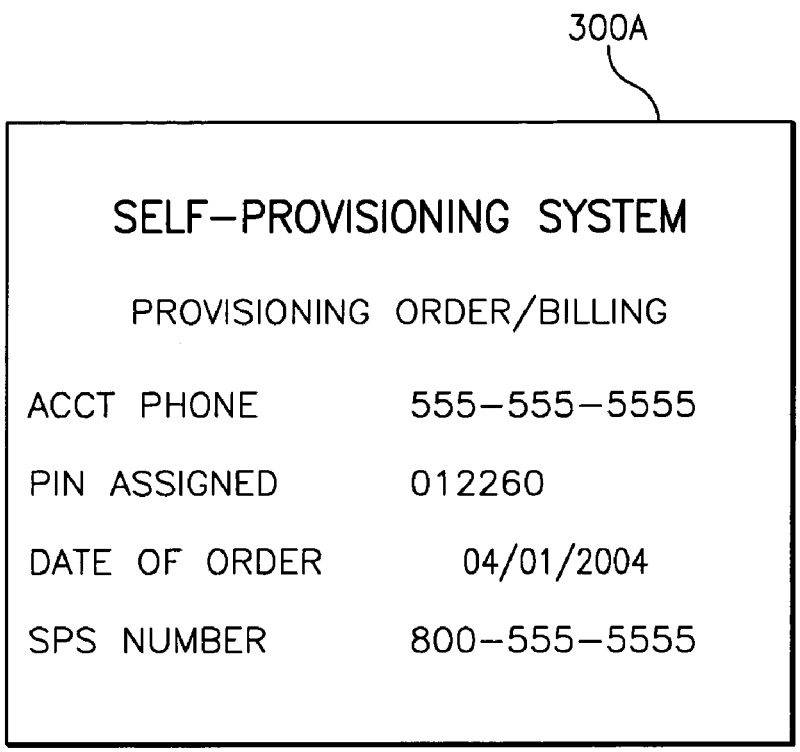
FIGS. 3A and 3B illustrate sample provisioning orders created via the self-provisioning system in exemplary embodiments.
Figure 3B:
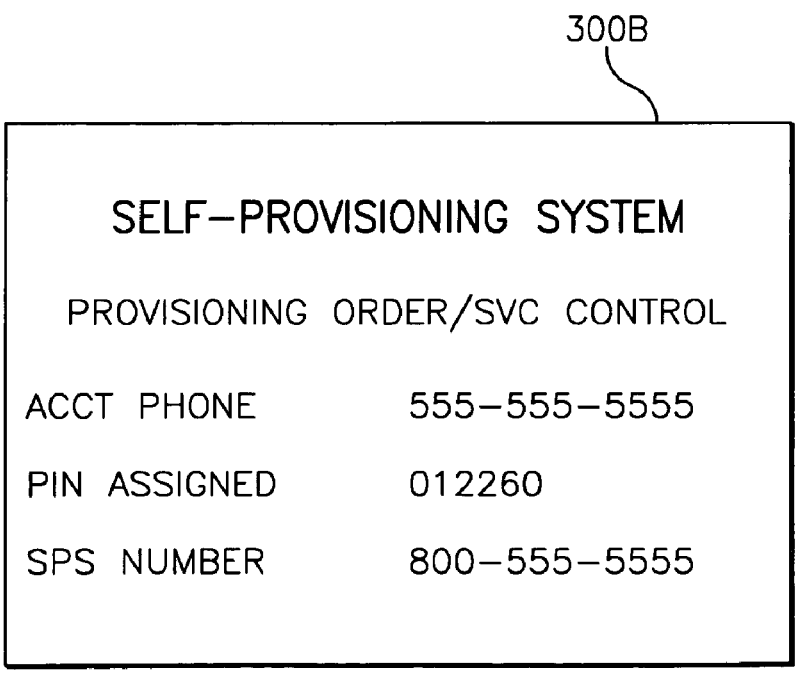

Service control server 112 stores self-provisioning service (SPS) access numbers in a data store 114 and stores SPS provisioned orders in a data store 115. SPS access numbers 114 refer to pre-established toll free numbers that are exclusively allocated by host system 104 for implementing the self-provisioning system. Access numbers 114 are provided to customers of the telecommunications service provider. Data for provisioned orders in data store 115 is received from provisioning server 128 for activating the SPS services described herein. The type of data that may be included in a provisioning order received from provisioning server 128 is shown in FIG. 3B. This data may be reformatted to a format usable by service control server 112. For example, the provisioning order data of FIG. 3B may be reformatted into binary code or a format utilizing data compression for facilitating the storage requirements of server control server 112. Service control server 112 may be a proprietary application or may comprise the Enhanced Control Server (eCS) by Lucent Technologies® of Murray Hill, N.J. Service control server 112 communicates with resource server 116, billing server 103, and provisioning server 128 via packet-switched network 108 or similar means.

Resource server 116 enables a service provider of host system 104 to provide enhanced customer services such as those provided by the self-provisioning system. Resource server 116 includes text-to-speech capabilities and supports multimedia and multi-lingual requirements. For example, the user interface 118 may communicate with customers by providing prompts using, e.g., voice, text, and/or multi-media formats depending upon the type of calling device (e.g., 102) used. Resource server 116 may be a proprietary application or may comprise the Enhanced Media Resource Server (eMRS) by Lucent Technologies®. Resource server 116 further executes an application and user interface 118 for implementing the self-provisioning system services.

Resource server 116 is in communication with a data repository 120, which stores databases of customer telephone numbers 122, toll free telephone numbers 124, and personal identification numbers (PINs) 126. Customer telephone numbers 122 refer to the telephone lines associated with the customer accounts and may be business lines or personal lines. A pre-established listing of available toll free telephone numbers are allocated by host system 104 for the self-provisioning system and are maintained in database 124. According to an exemplary embodiment, the self-provisioning system is capable of supporting at least 1,000 toll free telephone numbers. A pre-defined listing of PINs may also be established and maintained in database 126. In exemplary embodiments, the self-provisioning system is capable of supporting at least 10,000 PINs. A single toll free telephone number may be assigned to multiple individuals whereby customers sharing the same toll free telephone number are distinguishable by their unique PIN. PINs may range in length from four digits to ten digits. In alternative embodiments, customers may assign their own PINs by entering and validating a unique user-selected number into telephone 102. This assignment may be facilitated via prompts from the self-provisioning system application and user interface 118. Provisioning orders may be generated by the self-provisioning system application 118 in response to customer requests as described further herein.

Data repository 120 may be a separate physical storage device that is addressable by server 116 as shown in FIG. 1. It will be understood, however, that data repository 120 and server 116 may alternatively comprise a single unit, such as a mainframe computer, and that they are shown as separate units in FIG. 1 for purposes of illustration.

Provisioning server 128 provisions the databases for intelligent network services such as the self-provisioning system application and user interface 118 as well as voice files running on the intelligent network platform. Provisioning server 128 receives provisioning orders from resource server 116. These provisioning orders may be in text format as shown, e.g., in FIGS. 3A-3B. The provisioning orders may be reformatted by the provisioning server 128 into a data structure recognizable by service control server 112. For example, the provisioning data may be compressed to facilitate the limited storage requirements of service control server 112. In this manner, the provisioning order data that comprise the provisioned orders in data store 115 may be in a compressed format. This reformatted provisioning data is transmitted to service control server 112 via network 108. Provisioning server 128 may execute a proprietary application or may execute the Enhanced Services Manager (eSM) by Lucent Technologies®.

Provisioning server 128 may also store records of provisioning orders in a data store 130 as a back-up security measure in the event of a system failure. Provisioning server 128 may also manage other services offered in addition to the self-provisioning services described herein. In alternate embodiments, a single server may be utilized to provide the functionality described above with respect to resource server 116 and provisioning server 128.

In exemplary embodiments, customers/callers may activate the self-provisioning telephony service from their home phones (e.g., wireline phones linked to the toll-free number assigned by host system 104) for security purposes. However, it will be understood that activation may occur from an alternate location or device if sufficient security measures are adopted to prevent unauthorized activation of toll-free numbers and other system abuses.

The implementation of the self-provisioning system is described herein with respect to voice-initiated communications from a customer telephone 102. Exemplary embodiments, however, further include implementation of the self-provisioning system using next generation network technologies such as voice over Internet protocol (VoIP), whereby a customer initiates activation of the SPS services via a computer-enhanced device such as a personal computer, web-enabled mobile telephone, and similar digital devices.

Figure 2:
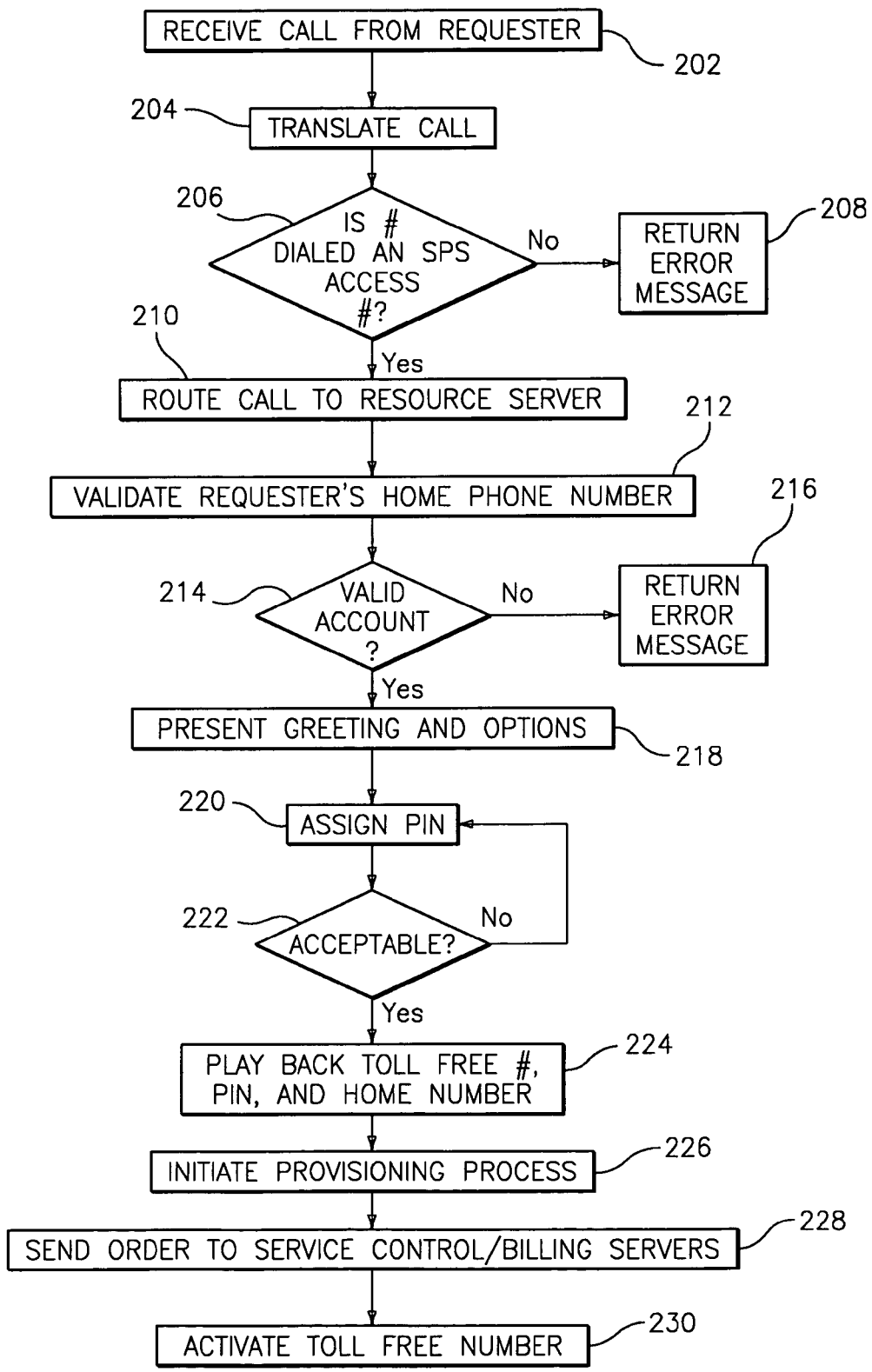
FIG. 2 is a flowchart describing a process for implementing the self-provisioning system in exemplary embodiments.

Execution of the self-provisioning system will now be described with reference to FIG. 2. For ease of explanation, the processes described in FIG. 2 presuppose that a telecommunications customer of host system 104 is a residential customer and that the customer has received an invitation by host system 104 to request a personal toll-free number. This invitation may come by postal mail, electronic mail, telephone, or other similar means. The invitation may include a toll-free number that is uniquely assigned to the residential customer or to a specified number of customers as described above. The invitation may further include a toll free SPS number that is used to initiate contact with the self-provisioning system and activate a toll free telephone number. This toll free SPS number may also be used to modify a customer's SPS service (e.g., change a PIN assignment), to retrieve a forgotten PIN, and to cancel the toll free SPS service.

At step 202, a customer/caller who is interested in receiving the SPS services calls the SPS access number found in the invitation. The call is routed from carrier switch 110 to service control server 112, which in turn translates the call at step 204. The translation process is described above with reference to FIG. 1. The number dialed by the customer is compared with SPS access numbers in database 114. If the results of the comparison indicate that the number dialed is not an SPS access number at step 206 (e.g., no match is found in database 114), an error message is returned to the customer at step 208. If the number is confirmed to be an SPS access number at step 206, the call is then routed via carrier switch 110 to resource server 116 over trunk 111 at step 210. Resource server 116 validates the requester's identity by comparing the customer's phone number (e.g., the telephone number from which the customer placed the call and which is tied with the customer's telecommunications service account) with customer number database 122 in data repository 120 at step 212. If it is determined that the customer is not a valid account holder at step 214, an error message is transmitted to the customer at step 216. This may be a voice recording that is activated by resource server 116 and presented to the customer via carrier switch 110 and PSTN 106.

If it is confirmed that the customer is a valid account holder at step 214, resource server 116 presents a recorded greeting to the customer, along with options for directing the customer to activate the toll free number at step 218. The prompts may include instructions for validating the customer's identity, or may include directions for activating, modifying, or canceling a toll-free number. The prompts may also include terms and conditions of the SPS services, including fees and cancellation penalties, if applicable. In response to the customer's responses to these directions, the resource server 116 assigns a PIN number to the customer at step 220. The PIN number may be selected by resource server 116 from a database 126 of SPS PIN numbers in data repository 120. The customer may, in turn, accept or reject the PIN number assigned by responding to prompts to accept or reject the PIN assignment. If the customer does not accept the pin number at step 222, the resource server 116 retrieves an alternate PIN number from database 126 and presents it to the customer at step 220. If the customer accepts the PIN at step 222, or alternatively, if the customer accepts an alternative PIN at step 222, the resource server 116 presents the toll free number, PIN, and the customer's phone number as confirmation of the transaction at step 224. The customer may then be prompted to accept the SPS service and its terms and conditions.

The provisioning process is then initiated by the resource server 116 at step 226. The provisioning process includes generating a provisioning order by resource server 116 and transmitting the provisioning order to provisioning server 128. Sample provisioning orders are shown in FIGS. 3A-3B. Provisioning server 128 forwards the provisioning order 300A to billing server 103 so that billing server 103 can ensure that the customer is billed for the service at step 228. Billing server 103, in turn, stores the provisioned orders received in database 105. Provisioning server 128 also reformats the provisioning order data as described in FIG. 1 and transmits the reformatted data to service control server 112 as part of step 228. Likewise, resource server 116 updates its toll-free number database 124 and PIN database 126 to reflect that this number and PIN are no longer available for assignment. Once service control server 112 receives the reformatted provisioning order data, it activates the toll free number at step 230. This reformatted provisioning order data is stored in database 113. The customer's toll free number is now ready for use. The entire provisioning process as recited in steps 202-230 may be completed in minutes without any human intervention.

The provisioning order shown in FIG. 3A represents the type of data that is provided to billing server 103 in order to manage the customer billing for the SPS service. The provisioning order of 300A includes an order date reflecting the date in which the SPS service was activated. Provisioning order 300B, however, does not require an order date as the data is used by service control server 112 to automatically activate the service immediately upon receipt of the provisioning order.

A customer may modify and/or cancel his/her toll free number service (or retrieve a forgotten PIN) by calling the SPS access number and following the prompts to either modify or cancel the service. The process steps for modifying and canceling service are similar to those described above with respect to activating the service.

As can be seen from the above, the self-provisioning system facilitates 24-hour self-provisioning of toll-free number services. The service user calls the toll-free service number, provides input in response to prompts, and selects a pin. The toll-free number is activated in minutes once a provisioning order is processed through the provisioning system. In a similar manner, service users may modify and/or cancel their toll-free service. This is accomplished without the need for any human interaction.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing self-provisioning telephony services, comprising:
    transmitting, via at least one computer processor, an invitation to a customer calling device of a customer for initiating the self-provisioning telephony services, the invitation including a toll-free telephone number that is uniquely assigned to the customer and a designated access number allocated for implementing the self-provisioning telephony services;
    receiving, via the at least one computer processor, a request for the self-provisioning services from a caller via the designated access number, the caller identified as the customer via a telephone number from which the request was initiated, the telephone number linked to a telecommunications service account of the customer;
    prompting, via the at least one computer processor, the caller to provide information for facilitating implementation of the self-provisioning services; and
    activating, via the at least one computer processor, the toll-free telephone number in response to a provisioning order generated and processed as a result of the information provided by the caller, the provisioning order including a uniquely assigned personal identification number assigned to the caller and the toll-free telephone number assigned to the customer via the invitation;
    wherein the self-provisioning services are implemented without human intervention from a telecommunications service provider, via the at least one computer processor and associated with the telecommunications service account, the self-provisioning telephony services further including:
        modifying an account for an existing toll-free telephone number of the caller;
        retrieving a forgotten personal identification number associated with the caller; and
        canceling an account for an existing toll-free telephone number of the caller.

2. The method of claim 1, wherein the prompts include directions for performing functions including:
    validating the caller's identity;
    assigning the personal identification number to the caller;
    accepting the new toll-free telephone number;
    modifying an existing personal identification number;
    canceling an existing toll-free telephone number;
    retrieving a forgotten personal identification number; and
    accepting terms and conditions of the account.

3. The method of claim 1, further comprising charging, via the at least one computer processor, a fee for the account, the fee based upon at least one of:
    minutes of use incurred for the toll-free telephone number; and
    a flat periodic fee based upon time the account is active.

4. The method of claim 1, wherein the assigning a personal identification number to the caller is performed by the caller in response to receiving a request for a caller-selected personal identification number.

5. The method of claim 1, wherein the provisioning order includes a current telephone number of the caller.

6. The method of claim 1, wherein the toll-free telephone number is shared by multiple callers, wherein accounts of the multiple callers are distinguishable by a unique personal identification number assigned to each of the accounts.

7. The method of claim 1, wherein the assigning a personal identification number to the caller is performed by the telecommunications service provider.

8. A system for providing self-provisioning telephony services, comprising:
    a service control server in communication with a customer calling device, the service control server operable for receiving a request for the self-provisioning telephony services from a caller via the customer calling device and a designated access number allocated for implementing the self-provisioning telephony services, the request received in response to an invitation transmitted to a customer, the invitation including the designated access number and a toll-free telephone number that is uniquely assigned to the customer, the caller identified via a telephone number from which the request was initiated, the telephone number linked to a telecommunications service account of the customer; and
    a resource server in communication with the service control server, the resource server executing a self-provisioning application and user interface, the self-provisioning application and user interface operable for prompting the caller to provide information and generating a provisioning order resulting from responses to prompts;
    wherein the service control server activates the toll-free telephone number in response to the provisioning order and without human intervention, the provisioning order including a personal identification number that is uniquely assigned to the caller; and wherein the self-provisioning telephony services further include:
   modifying an account for an existing toll-free telephone number of the caller;
   retrieving a forgotten personal identification number associated with the caller; and
   canceling an account for an existing toll-free telephone number of the caller;
wherein the telephone number is shared by multiple customers, wherein accounts of the multiple customers are distinguishable by a unique personal identification number assigned to each of the accounts.

9. The system of claim 8, further comprising a provisioning server in communication with the resource server and the service control server, the provisioning server operable for:
   reformatting the provisioning order received from the resource server to a data format usable by the service control server; and
   transmitting reformatted provisioning order data to the service control server for execution of self-provisioning services identified in the reformatted provisioning order data.

10. The system of claim 9, further comprising a billing server in communication with the provisioning server, the billing server receiving provisioning orders from the provisioning server for managing bills of customers that utilize the self-provisioning services.

11. The system of claim 8, wherein the prompts include directions for performing at least one of:
   validating the caller's identity;
   assigning the personal identification number to the caller;
   accepting the new toll-free telephone number;
   modifying an existing personal identification number;
   retrieving a forgotten personal identification number;
   canceling an existing toll-free telephone number; and
   accepting terms and conditions of the account.

12. The system of claim 8, wherein the provisioning order includes the assigned toll-free telephone number and a current telephone number of the caller.

13. The system of claim 8, wherein prompts to the caller are presented in a format including at least one of:
   voice;
   text; and
   web-based; and
   multi-media.

14. A storage medium encoded with machine-readable program code for providing self-provisioning services, the program code including instructions for causing a host system to implement a method, comprising:
   transmitting an invitation to a customer for initiating the self-provisioning telephony services, the invitation including a toll-free telephone number that is uniquely assigned to the customer and a designated access number allocated for implementing the self-provisioning telephony services;
   receiving a request for the self-provisioning services from a caller via the designated access number, the caller identified as the customer via a telephone number from which the request was initiated, the telephone number linked to a telecommunications service account of the customer;
   prompting the caller to provide information for facilitating implementation of the self-provisioning services; and
   activating the toll-free telephone number in response to a provisioning order generated and processed as a result of the information provided by the caller, the provisioning order including a personal information number that is uniquely assigned to the caller;
   wherein the self-provisioning telephony services further include:
      modifying an account for an existing toll-free telephone number of the caller;
      retrieving a forgotten personal identification number associated with the caller; and
      canceling an account for an existing toll-free telephone number of the caller;
   wherein the assigning a personal identification number to the caller is performed by at least one of:
      the telecommunications service provider; and
      the caller in response to receiving a request for a caller-selected personal identification number.

15. The storage medium of claim 14, wherein the prompts include directions for performing functions including:
   validating the caller's identity;
   assigning the personal identification number to the caller;
   accepting the new toll-free telephone number;
   modifying an existing personal identification number;
   canceling an existing toll-free telephone number;
   retrieving a forgotten personal identification number; and
   accepting terms and conditions of the account.

16. The storage medium of claim 14, further comprising instructions for performing:
   charging a fee for the account, the fee based upon at least one of:
      minutes of use incurred for the toll-free telephone number; and
      a flat periodic fee based upon time the account is active.

17. The storage medium of claim 14, wherein the provisioning order includes a current telephone number of the caller.

18. The storage medium of claim 14, wherein the toll-free telephone number is shared by multiple callers, wherein accounts of the multiple callers are distinguishable by a unique personal identification number assigned to each of the accounts.

* * * * *